US008903820B2

(12) United States Patent
Trossen et al.

(10) Patent No.: US 8,903,820 B2
(45) Date of Patent: Dec. 2, 2014

(54) METHOD, SYSTEM AND COMPUTER PROGRAM TO ENABLE QUERYING OF RESOURCES IN A CERTAIN CONTEXT BY DEFINITION OF SIP EVEN PACKAGE

(75) Inventors: Dirk Trossen, Cambridge, MA (US); Dana Pavel, Cambridge, MA (US)

(73) Assignee: Nokia Corporation, Espoo (FI)

( * ) Notice: Subject to any disclaimer, the term of this patent is extended or adjusted under 35 U.S.C. 154(b) by 1760 days.

(21) Appl. No.: 10/874,946

(22) Filed: Jun. 23, 2004

(65) Prior Publication Data

US 2005/0289097 A1    Dec. 29, 2005

(51) Int. Cl.

| | |
|---|---|
| *G06F 7/00* | (2006.01) |
| *G06F 17/30* | (2006.01) |
| *H04L 12/24* | (2006.01) |
| *H04L 29/08* | (2006.01) |
| *H04L 29/06* | (2006.01) |
| *H04W 12/06* | (2009.01) |
| *H04W 28/16* | (2009.01) |
| *H04W 80/10* | (2009.01) |

(52) U.S. Cl.
CPC .............. *H04L 41/06* (2013.01); *H04L 67/14* (2013.01); *H04L 63/102* (2013.01); *H04W 12/06* (2013.01); *H04W 28/16* (2013.01); *H04W 80/10* (2013.01)
USPC .......................................... 707/736; 709/220

(58) Field of Classification Search
USPC ........................................................ 707/736
See application file for complete search history.

(56) References Cited

U.S. PATENT DOCUMENTS

| | | | |
|---|---|---|---|
| 5,596,744 A * | 1/1997 | Dao et al. ......................... 707/10 |
| 5,809,119 A | 9/1998 | Tonomura et al. |
| 5,875,306 A | 2/1999 | Bereiter ......................... 709/220 |
| 5,909,549 A | 6/1999 | Compliment et al. ........ 709/223 |
| 5,941,947 A | 8/1999 | Brown et al. .................. 709/225 |
| 5,968,116 A | 10/1999 | Day, II et al. |
| 5,978,842 A | 11/1999 | Noble et al. .................. 709/218 |
| 5,991,810 A | 11/1999 | Shapiro et al. ................ 709/229 |
| 6,044,403 A | 3/2000 | Gerszberg et al. |
| 6,091,724 A | 7/2000 | Chandra et al. |
| 6,130,933 A | 10/2000 | Miloslavsky .............. 379/90.01 |

(Continued)

FOREIGN PATENT DOCUMENTS

| | | |
|---|---|---|
| EP | 1 193 912 A2 | 4/2002 |
| EP | 1 280 314 A2 | 1/2003 |

(Continued)

OTHER PUBLICATIONS

Ding et. al. "Ontology Library Systems: the key to successful Ontology Re-use" 2001. Stanford University.*

(Continued)

*Primary Examiner* — Robert Beausoliel, Jr.
*Assistant Examiner* — Michael Pham
(74) *Attorney, Agent, or Firm* — Harrington & Smith

(57) ABSTRACT

Disclosed is a system and a method to provide event notification. The method operates an event server (20) with a subscriber unit (12). The method includes formulating a query; sending a subscription request message to the event server, the subscription request message comprising the query; responsive to a receipt of the subscription request message, parsing the query; and accepting the subscription request if the query is successfully parsed and understood, and if appropriate resource data is available to the event server to determine a result of the query.

39 Claims, 2 Drawing Sheets

(56) References Cited

U.S. PATENT DOCUMENTS

| | | | |
|---|---|---|---|
| 6,167,449 A | 12/2000 | Arnold et al. | |
| 6,208,998 B1 | 3/2001 | Marcus | |
| 6,212,192 B1 | 4/2001 | Mirashrafi et al. | 370/401 |
| 6,216,132 B1 | 4/2001 | Chandra et al. | |
| 6,249,814 B1 | 6/2001 | Shaffer et al. | 709/223 |
| 6,259,774 B1 | 7/2001 | Miloslavsky | 379/90.01 |
| 6,298,356 B1 | 10/2001 | Jawahar et al. | 707/201 |
| 6,324,563 B1 | 11/2001 | Hotea et al. | 718/104 |
| 6,360,260 B1 | 3/2002 | Compliment et al. | |
| 6,363,411 B1 | 3/2002 | Dugan et al. | 709/202 |
| 6,393,421 B1 | 5/2002 | Paglin | 707/9 |
| 6,421,781 B1 | 7/2002 | Fox et al. | 726/4 |
| 6,426,947 B1 | 7/2002 | Banker et al. | 370/254 |
| 6,567,848 B1 | 5/2003 | Kusuda et al. | 709/219 |
| 6,571,095 B1 | 5/2003 | Koodli | 455/435.1 |
| 6,594,682 B2 | 7/2003 | Peterson et al. | 718/102 |
| 6,615,236 B2 | 9/2003 | Donovan et al. | 709/203 |
| 6,625,141 B1* | 9/2003 | Glitho et al. | 370/352 |
| 6,643,650 B1 | 11/2003 | Slaughter et al. | 707/10 |
| 6,658,095 B1 | 12/2003 | Yoakum et al. | 379/93.01 |
| 6,668,276 B1 | 12/2003 | Ohkado et al. | 709/217 |
| 6,704,396 B2 | 3/2004 | Parolkar et al. | 379/88.17 |
| 6,711,682 B1 | 3/2004 | Capps | 713/184 |
| 6,725,281 B1 | 4/2004 | Zintel et al. | 719/318 |
| 6,742,127 B2 | 5/2004 | Fox et al. | 726/10 |
| 6,771,971 B2 | 8/2004 | Smith | 455/456.1 |
| 6,792,466 B1 | 9/2004 | Saulpaugh et al. | 709/229 |
| 6,842,447 B1 | 1/2005 | Cannon | 370/352 |
| 6,850,979 B1 | 2/2005 | Saulpaugh et al. | 709/225 |
| 6,859,837 B2 | 2/2005 | Watanabe et al. | 709/229 |
| 6,914,975 B2 | 7/2005 | Koehler et al. | 379/265.05 |
| 6,917,930 B1 | 7/2005 | Brodale et al. | 707/2 |
| 6,938,079 B1 | 8/2005 | Anderson et al. | 709/222 |
| 7,110,984 B1 | 9/2006 | Spagna et al. | 705/57 |
| 7,139,247 B2 | 11/2006 | Desai et al. | 370/255 |
| 7,170,863 B1 | 1/2007 | Denman et al. | 370/352 |
| 7,177,902 B2* | 2/2007 | Hubbard | 709/203 |
| 7,193,985 B1 | 3/2007 | Lewis et al. | 370/338 |
| 7,194,637 B1 | 3/2007 | Crawford | 713/153 |
| 7,219,153 B1* | 5/2007 | Day | 709/229 |
| 7,225,238 B1 | 5/2007 | Dantu et al. | 709/219 |
| 7,302,383 B2* | 11/2007 | Valles | 704/9 |
| 7,356,832 B1 | 4/2008 | Eibach et al. | 726/2 |
| 7,702,726 B1 | 4/2010 | Grabelsky et al. | 709/204 |
| 2002/0018464 A1* | 2/2002 | Kikinis | 370/352 |
| 2002/0075844 A1 | 6/2002 | Hagen | 370/351 |
| 2002/0101880 A1 | 8/2002 | Kim | 370/465 |
| 2002/0103898 A1* | 8/2002 | Moyer et al. | 709/224 |
| 2002/0122055 A1* | 9/2002 | Parupudi et al. | 345/737 |
| 2002/0126701 A1* | 9/2002 | Requena | 370/352 |
| 2002/0131395 A1* | 9/2002 | Wang | 370/349 |
| 2002/0143877 A1 | 10/2002 | Hackbarth et al. | 709/205 |
| 2002/0194183 A1* | 12/2002 | Yoakum et al. | 707/10 |
| 2003/0005034 A1 | 1/2003 | Amin | 709/202 |
| 2003/0005132 A1 | 1/2003 | Nguyen et al. | 709/229 |
| 2003/0026289 A1 | 2/2003 | Mukherjee et al. | 709/203 |
| 2003/0036917 A1 | 2/2003 | Hite et al. | 705/1 |
| 2003/0040280 A1 | 2/2003 | Koskelainen | |
| 2003/0041101 A1* | 2/2003 | Hansche et al. | 709/203 |
| 2003/0048195 A1 | 3/2003 | Trossen | |
| 2003/0073440 A1 | 4/2003 | Mukherjee et al. | 455/435 |
| 2003/0093462 A1 | 5/2003 | Koskelainen et al. | 709/203 |
| 2003/0101247 A1 | 5/2003 | Kumbalimutt et al. | 709/221 |
| 2003/0101266 A1* | 5/2003 | Trossen | 709/229 |
| 2003/0122856 A1* | 7/2003 | Hubbard | 345/700 |
| 2003/0140103 A1* | 7/2003 | Szeto et al. | 709/206 |
| 2003/0149774 A1 | 8/2003 | McConnell et al. | |
| 2003/0217099 A1 | 11/2003 | Bobde et al. | 709/202 |
| 2003/0217142 A1 | 11/2003 | Bobde et al. | 709/224 |
| 2003/0217165 A1 | 11/2003 | Buch et al. | |
| 2004/0003058 A1* | 1/2004 | Trossen | 709/220 |
| 2004/0006623 A1 | 1/2004 | Gourraud et al. | 709/227 |
| 2004/0010491 A1 | 1/2004 | Riedinger | 17/30 |
| 2004/0052342 A1* | 3/2004 | Jugovec et al. | 379/88.22 |
| 2004/0054672 A1 | 3/2004 | Tsuchitani et al. | |
| 2004/0054690 A1* | 3/2004 | Hillerbrand et al. | 707/104.1 |
| 2004/0059781 A1 | 3/2004 | Yoakum et al. | |
| 2004/0083092 A1* | 4/2004 | Valles | 704/9 |
| 2004/0083291 A1* | 4/2004 | Pessi et al. | 709/227 |
| 2004/0098491 A1 | 5/2004 | Costa-Requena et al. | 709/229 |
| 2004/0103157 A1 | 5/2004 | Requena et al. | 709/206 |
| 2004/0107143 A1 | 6/2004 | Niemi et al. | 705/26 |
| 2004/0121765 A1 | 6/2004 | Idnani et al. | |
| 2004/0128344 A1* | 7/2004 | Trossen | 709/203 |
| 2004/0139198 A1* | 7/2004 | Costa-Requena et al. | 709/227 |
| 2004/0141594 A1 | 7/2004 | Brunson et al. | 379/88.12 |
| 2004/0153547 A1* | 8/2004 | Trossen | 709/228 |
| 2004/0153552 A1* | 8/2004 | Trossen et al. | 709/229 |
| 2004/0184452 A1* | 9/2004 | Huotari et al. | 370/384 |
| 2004/0215665 A1* | 10/2004 | Edgar et al. | 707/200 |
| 2004/0255302 A1* | 12/2004 | Trossen | 719/318 |
| 2004/0260749 A1* | 12/2004 | Trossen et al. | 709/200 |
| 2005/0021976 A1* | 1/2005 | Trossen | 713/182 |
| 2005/0108347 A1* | 5/2005 | Lybeck et al. | 709/207 |
| 2005/0170861 A1 | 8/2005 | Niemi et al. | |
| 2005/0197995 A1* | 9/2005 | Badt et al. | 707/1 |
| 2005/0216576 A1* | 9/2005 | Nastacio et al. | 709/223 |
| 2005/0289096 A1* | 12/2005 | Trossen et al. | 707/1 |
| 2008/0294644 A1* | 11/2008 | Liu et al. | 707/10 |

FOREIGN PATENT DOCUMENTS

| | | |
|---|---|---|
| EP | 1 588 236 | 10/2005 |
| JP | 2004-013479 | 1/2004 |
| JP | 2004-172818 | 6/2004 |
| WO | WO-02/103559 A2 | 12/2002 |
| WO | WO-03/038670 A1 | 5/2003 |
| WO | WO-03/054717 A | 7/2003 |
| WO | WO 03/054717 A1 | 7/2003 |
| WO | WO-03/065701 A1 | 8/2003 |
| WO | WO 03/065701 A1 | 8/2003 |
| WO | WO-03/081876 A1 | 10/2003 |
| WO | WO 03/102845 A2 | 12/2003 |
| WO | WO-03/107692 A1 | 12/2003 |
| WO | WO-2004/003775 A1 | 1/2004 |
| WO | WO-2004/006533 A1 | 1/2004 |
| WO | WO-2004/008178 A2 | 1/2004 |
| WO | WO-2004/059502 A1 | 7/2004 |
| WO | WO-2004/063837 A | 7/2004 |
| WO | WO 2004/063837 A2 | 7/2004 |
| WO | WO 2004/068265 A2 | 8/2004 |
| WO | WO-2004/068265 A2 | 8/2004 |
| WO | WO-2004/114633 A1 | 12/2004 |

OTHER PUBLICATIONS

Wang, et. al., "An Ontology-Based Publish/Subscribe System", In Middleware '04: Proceedings of the 5th ACM/IFIP/USENIX international conference on Middleware, pp. 232-253, New York, NY, USA 2004. Springer-Veriag New York, Inc.*

Pavel et. al. "Context provisioning and SIP events". Jun. 6, 2004. MobiSys 2004 Workshop on Context Awareness. pp. 1-6.*

"Partial Notification of Presence Information", M. Lonnfors et al., IETF Draft, Jan. 2004, pp. 1-14.

"A Mechanism for Content Indirection in Session Initiation Protocol (SIP) Messages", S. Olson, IETF Draft, Dec. 2003, pp. 1-16.

"The Extensible Markup Language (XML) Configuration Access Protocol (XCAP)", J. Rosenberg, IETF Draft, May 2003, pp. 1-18.

"Ontology Library Systems: The key to successful Ontology Reuse", Y. Ding, et al., Vrije Universiteit, Amsterdam, the Netherlands, 20 pages.

"SIP: Session Initiation Protocol", J. Rosenberg, et al., AT&T, Jun. 2002, pp. 1-236.

"Session Initiation Protocol (SIP)—Specific Event Notification", A. B. Roach, Network Working Group, Jun. 2002, pp. 1-34.

A Watcher Information Event Template-Package for the Session Initiation Protocol (SIP), J. Rosenberg, SIMPLE WG, Jan. 31, 2003, pp. 1-18.

J. Rosenberg: "A Watcher Information Event Template-Package for the Session Initiation Protocol (SIP)", Jul. 2003, IETF-Draft, draft-ietf-simple-w9info-package-05.txt, http://www.jdrosen.net/papers/draft-ietf-simple-winfo-package-05.txt.

(56) References Cited

OTHER PUBLICATIONS

RCF 3265—"Session Initiation Protocoll (SIP)—Specific Even Notification", Jun. 2002, A.B. Roach, http://www.faqs.org/rfcs/rfc3265.html.
TSG CN, Universal Mobile Telecommunications Systems (TMTS); Presence Service; Architecture and Functional Description (3GPP TS 23.141 Version 6.1.0 Release 6); Dec. 2002, pp. 1-31.
Castro, P. et al., "Locating Application Data Across Service Discovery Domains", Year of Publication: 2001, International Conference on Mobile Computing and Networking Proceedings of the 7th Annual International Conference on Mobile Computing and Networking, Rome Italy, pp. 28-42.
Rosenberg, J., "A Presence Event Package for the Session Initiation Protocol (SIP)", Internet Engineering Task Force, Internet Draft, Dec. 6, 2002, pp. 1-20.
Schulzrinne, "SIP Registration", Internet Engineering Task Force, Internet Draft, Apr. 16, 2001, pp. 1-8.
Rosenberg, J. et al., "Requirements for Manipulation of Data Elements in SIMPLE Systems", Internet Engineering Task Force, Internet Draft, Oct. 9, 2002, pp. 1-13.
Rosenberg, J., "A Session Initiation Protocol (SIP) Event Template-Package for Watcher Information", Internet Engineering Task Force, Internet Draft, May 20, 2002, pp. 1-15.
Handley, M. et al., "SDP: Session Description Protocol", Network Working Group, RFC 2327, Apr. 1998, pp. 1-33.
Rosenberg, J., "A Session Initiation Protocol (SIP) Event Package for Registrations", Internet Engineering Task Force, Internet Draft, May 28, 2002, pp. 1-19.
J. Rosenberg, "A Presence Event Package for the Session Initiation Protocol (SIP)", Internet Draft, IETF, Jan. 2003, pp. 1-24.
"Requirements for Content Indirection in Session Initiation Protocol (SIP) Messages", S. Olson, IETF, Feb. 27, 2003, 10 pgs.
European Office action for corresponding EP App. No. 05 753 066. 9-2413 dated May 7, 2010, pp. 1-4.
European Office action for corresponding EP App. No. 05 753 066. 9-2413 dated May 16, 2007, pp. 1-4.
Japanese Office action for corresponding JP App. No. 2007-517510 dated Jun. 17, 2010, pp. 1-12, translated portion only.
Canadian Office action for corresponding CA app. No. 2,571,413 dated Jul. 19, 2010, pp. 1-3.
Japanese Office action for corresponding JP App. No. 2007-517510 dated Aug. 25, 2010, pp. 1-11, translated portion only.
Canadian Office action for corresponding CA app. No. 2,571,413 dated Mar. 9, 2009, pp. 1-5.
Indian Office action for corresponding IN application No. 363/DELNP/2007 dated Jan. 29, 2011, pp. 1-2.
J. Kempf et al., "Finding a SIP Server with SLP", Internet Engineering Task Force, Internet Draft-expired, Feb. 2000, pp. 1-13.
M. Handley et al., "SIP: Session Initiation Protocol", Internet Official Protocol Standards, Request for Comments: 2543, Category: Standards Track, Mar. 1999, pp. 1-143.
J. Veizades et al., "Service Location Protocol" Internet Official Protocol Standards, Request for Comments: 2165 Category: Standards Track, Jun. 1997, pp. 1-68.
H. Schulzrinne, "SIP Registration", Internet Engineering Task Force, Internet Draft, ietf-schulzrinne-sip-register-00.txt, Oct. 5, 2000, expires: Feb. 2000, pp. 1-9.
A Collection of Jini™ Technology Helper Utilities and Services Specifications, Sun® microsystems, Version 1.2, Dec. 2001.
Jini™ Technology Core Platform Specification, Sun® Microsystems, Version 1.2, Dec. 2001.
Jini™ Device Architecture Specification, Sun® Microsystems, Version 1.2, Dec. 2001.
Turanyi et al., Global Internet Roaming with ROAMIP, ACM Mobile Computing and Communications Review Jul. 2000, vol. 4, No. 3, pp. 58-68, particularly pp. 64-65.
J. Rosenburg et al., "SIP: Session Initiation Protocol", RFC 3261, Jun. 2002, 270 pgs.
Jini™ Technology Glossary, Sun® Microsystems, Version 1.2, Dec. 2001.
Jini™ Architecture Specification, Sun® microsystems, Version 1.2, Dec. 2001.
JavaSpaces™ Services Specification, Sun® microsystems, Version 1.2, Apr. 2002.
B. Campbell, S. Olson, J. Peterson, J. Rosenburg, B. Stucker, "SIMPLE Presence Publication Mechanism", Oct. 24, 2002, Internet Engineering Task Force.
Adam Roach, "SIP—Simple Event Notification", Feb. 2002, Internet Engineering Task Force.
Eric Miller, "An Introduction to the Resource Description Framework", May 1998, D-Lib Magazine, Retrieved from http://www.dlib.org/dlib/may98/miller/05miller.html, Apr. 28, 2004.
Schulzinne, SIP Registration:, Internet Engineering Task Force, Internet Draft,, Expired Oct. 2001.
Rosenberg, "Requirements for Manipulation of Data Elements in SIMPLE Systems", Internet Draft, Oct. 2002.
Rosenberg, "A Session Initiation Protocol (SIP) Event Template-Package for Watcher Information", Internet Draft, May 2002, 18 pgs.
Handley et al., "SDP: Session Description Protocol", RFC 2327, Apr. 1998, pp. 1-40.
Rosenberg, "A Session Initiation Protocol (SIP) Event Package for Registrations", Internet Draft, Oct. 2002, pp. 1-24.
"Presence Service; Architecture and Functional Description", 3GPP TS 23.141 V6.1.0, Dec. 2002, pp. 1-31 (XP002288176).
Rosenberg, J., "A Presence Event Package for the Session Initiation Protocol (SIP)", IETF Standard-Working-Draft, Internet Engineering Task Force, IETF, Dec. 6, 2002.
A Mechanism for Content Indirection in Session Initiation Protocol (SIP) Messages, Olson, SIP, Jun. 2, 2003, pp. 1-17.
"A Presence Event Package for the Session Initiation Protocol (SIP)," Rosenberg , Jan. 31, 2003, pp. 1-24, XP002962685.
"A Watcher Information Event Template-Package for the Session Initiation Protocol (SIP)", Rosenberg, Jan. 31, 2003, htt://www.ietf.org/internet-drafts/draft-ietf-simple-winfor-package-05.txt; pp. 1-18.
Ontology Library Systems: The key to successful Ontology Re-use, Ding et al., Division of Mathematics and Computer Science, Vrije Universiteit, Amsterdam, the Netherlands, 2001, 20 pgs.
OWL Web Ontology Language Guide, Smith et al., W3C Recommendation, Feb. 10, 2004, pp. 1-57.
RFC 3680—A Session Initiation Protocol (SIP) Event Package for Registrations, Rosenberg, Network Working Group, Mar. 2004, pp. 1-19.
Serendipitous Interoperability, Lassila, Norkia Research Center, Burlington, MA, pp. 1-9, 2002.
Simple Presence Publication Requirements, Campbell, et al., Nortel Networks, Inc., Feb. 11, 2003, pp. 1-10.
Internet Engineering Task Force, http://www.ieft.org/proceedings/02mar/1-D/draft-ieft-sip-events-05.txt, Feb. 2002, 38 pgs.
Internet Engineering Task Force, http://www.ieft.org/internet-drafts/draft-0lson-simple-publish-02.txt, Feb. 2003, 34 pgs.
M. Handley et al., SDP: Session Description Protocol, Internet Official Protocol Standards, Request for Comments: 2327, Category: Standards Track, Apr. 1998, pp. 1-40.
Roach, A.B., "Session Initiation Protocol (SIP)—Specific Event Notification", Network Working Group, XP-02280672, RFC 3265, Jun. 2002, pp. 1-38.
Campbell, et al., "SIMPLE Presence Publication Mechanism", Internet Draft, Jun. 2002, pp. 1-22.
S. Olson, Requirements for Content Indirection in Session Initiation Protocol (SIP) Messages; Feb. 2003, 10 pgs.; http://www.ietf.org/internet-drafts/draft-ietf-sipping-content-indirect-03.txt.
E. Mena, et al., An approach for Query Processing in Global Information Systems based on Interoperation Across Pre-Existing Onthologies, Cooperation Information Systems; Proceedings, First IFCIS International Conference on Brussels, Belgium, Jun. 1996, pp. 14-25, XP010200745, ISBN 0-8186-7505-5.
J. Rosenberg, A Session Initiation Protocol (SIP) Event Package for Registrations, Internet Engineering Task Force Internet Draft, May 2002, 23 pgs., XP002228499.

\* cited by examiner

METHOD, SYSTEM AND COMPUTER PROGRAM TO ENABLE QUERYING OF RESOURCES IN A CERTAIN CONTEXT BY DEFINITION OF SIP EVEN PACKAGE

CROSS-REFERENCE TO RELATED PATENT APPLICATIONS

This patent application is related to the following commonly assigned U.S. Patent Applications: D. Trossen, "Integration of Service Registration and Discovery in SIP Environments", Ser. No. 10/179,244, filed Jun. 26, 2002; D. Trossen, "Content and Service Registration, Query, and Notification using SIP Event Packages", Ser. No. 10/330,146, filed Dec. 30, 2002; D. Trossen, K. Mehta, "Access Control Alert Method using SIP Event Package", Ser. No. 10/353,014, filed Jan. 29, 2003; D. Trossen, "Querying for SIP Event Packages by Using SIP OPTIONS Method or by Using Service Discovery", Ser. No. 10/418,313, filed Apr. 18, 2003; and to D. Trossen, D. Pavel, "Application Semantic Binding through SIP Event Package Template", Ser. No. 10/465,455, filed Jun. 19, 2003, the disclosures of which are incorporated by reference in their entireties.

TECHNICAL FIELD

This invention relates generally to wireless communications systems and methods and, more specifically, relates to wireless terminals and wireless network nodes that use a Session Initiation Protocol (SIP).

BACKGROUND

The infrastructure of the Session Initiation Protocol (SIP) is defined in IETF RFC3261 (Rosenberg et al., June 2002). In general, the SIP is an application-layer control (signaling) protocol for creating, modifying and terminating sessions with one or more participants. The sessions can include Internet telephone calls, multimedia distribution and multimedia conferences. SIP invitations used to create sessions carry session descriptions that allow participants to agree on a set of compatible media types. SIP makes use of elements called proxy servers to help route requests to the user's current location, authenticate and authorize users for services, implement provider call-routing policies and provide features to users. SIP also provides a registration function that allows users to upload their current locations for use by proxy servers. SIP runs on top of several different transport protocols.

In "SIP-Specific Event Notification", A. Roach, RFC 3265, July 2002 (referred to hereafter simply as RFC 3265), there is described a SIP event framework to enable event-based information provisioning to any node in the Internet. This procedure is expected to become a key element within the SIP infrastructure. Examples of this kind of information are presence, location information, content/service availability, or access-controlled SIP events, as described in several of the above-referenced related patent applications.

As is discussed in RFC 3265, the general concept is that entities in the network can subscribe to resource or call state for various resources or calls in the network, and those entities (or entities acting on their behalf) can send notifications when those states change. A typical flow of messages would be:

| Subscriber | Notifier |
|---|---|
| \|-----SUBSCRIBE----\>\| | Request state subscription |
| \|\<--------200--------------\| | Acknowledge subscription |
| \|\<------NOTIFY---------\| | Return current state information |
| \|---------200-------------\>\| | Acknowledge |
| \|\<------NOTIFY--------\| | Return current state information |
| \|---------200-------------\>\| | Acknowledge |

Subscriptions are expired and must be refreshed by subsequent SUBSCRIBE messages.

Several useful definitions include the following:

Event Package: An event package is an additional specification which defines a set of state information to be reported by a notifier to a subscriber. Event packages also define further syntax and semantics based on the framework defined by RFC 3265 that are required to convey such state information.

Event Template-Package: An event template-package is a special kind of event package which defines a set of states which may be applied to all possible event packages, including itself.

Notification: Notification is the act of a notifier sending a NOTIFY message to a subscriber to inform the subscriber of the state of a resource.

Notifier: A notifier is a user agent which generates NOTIFY requests for the purpose of notifying subscribers of the state of a resource. Notifiers typically also accept SUBSCRIBE requests to create subscriptions.

State Agent: A state agent is a notifier which publishes state information on behalf of a resource; in order to do so, it may need to gather such state information from multiple sources. State agents always have complete state information for the resource for which they are creating notifications.

Subscriber: A subscriber is a user agent which receives NOTIFY requests from notifiers; these NOTIFY requests contain information about the state of a resource in which the subscriber is interested. Subscribers typically also generate SUBSCRIBE requests and send them to notifiers to create subscriptions.

Subscription: A subscription is a set of application state associated with a dialog. This application state includes a pointer to the associated dialog, the event package name, and possibly an identification token. Event packages will define additional subscription state information. By definition, subscriptions exist in both a subscriber and a notifier.

Subscription Migration: Subscription migration is the act of moving a subscription from one notifier to another notifier.

The SUBSCRIBE method is used to request current state and state updates from a remote node.

J. Rosenberg has defined in "A Watcher Information Event Template-Package for the Session Initiation Protocol (SIP)", draft-ietf-simple-winfo-package-05.txt, Jan. 31, 2003, a watcher information template-package for the SIP event framework. Watcher information in this context refers to a set of users that are subscribed to a particular resource within a particular event package. Watcher information changes dynamically as users subscribe, unsubscribe, are approved, or are rejected. A user can subscribe to this information, and therefore can learn of changes to this information. This particular event package is referred to as a template-package, as it can be applied to any event package, including itself.

The SIP event framework as presented in RFC 3265, is a technique to provide context information in general. For example, the SIP presence provides a particular piece of context information, using a particular SIP event package. However, current subscription solutions for SIP events, such as for SIP presence, watcherinfo, and even call-state information, only allow for subscription to state information that is associated with a particular resource, where the particular resource is addressed as a SIP URI. For example, a subscription to a presence event is bound to a so-called presentity, representing the user to which the presence information is associated. Hence, when subscribing to state information, the subscriber subscribe to state information of a particular, a priori known resource (addressed through the SIP URI). At present, it is not possible to subscribe to state information that has been derived from a set of state information associated to certain URIs.

Based on the foregoing, it may be appreciated that with the current subscription model of SIP questions (queries) such as:

"Which persons (resources) are in a meeting, the meeting being in a particular location?" and "Which persons (resources) are at work right now, with work location Boston, and are not busy?"
can only be answered by subscribing to all available and relevant resources at a particular SIP event server, and upon reception of notifications that are related to the required state information, by executing an appropriate application logic at the subscriber in order to determine the set of resources that would fulfil the given constraints. This is necessary since as currently defined SIP event subscriptions are bound to particular resources, e.g., a subscription to a SIP presence event is bound to the presentity.

It can be readily seen that such a solution is not scalable if one were to assume, by example, a fairly large domain such as a mobile operator, since such a solution could easily overburden the subscriber with respect to maintaining the subscriptions and handling incoming notifications, as well as the SIP event server with respect to creating such large numbers of subscriptions. Such a solution could also easily fail, for example by leaving out certain domains that are hosted at the particular SIP event server but that are unknown to the subscriber.

That is, the subscriber might "miss" certain resources by simply not knowing or not being aware of the relevance of the particular resource for the answer to the query. For example, a particular SIP event server may host event information for resources in two different domains, "domain1.com" and "domain2.com". Assume in this case that the subscriber is aware of the hosting of the first domain but not of the second domain. Hence, the subscriber would not subscribe to the relevant resources of the second domain and could therefore potentially "miss" important information.

Assuming the hosting of particular state information at a SIP event server for a multiplicity of resources at a certain time, it would be desirable to have a way to formulate the exemplary SIP queries given above within a single subscription, with the queries operating on an available set of information within the SIP event server. For example, since usually there exists presence information for a large set of presentities at a SIP presence server, it would be desirable to perform queries such as those above on the set of presentities within a single subscription. Prior to this invention, these needs were unfulfilled.

SUMMARY OF THE PREFERRED EMBODIMENTS

The foregoing and other problems are overcome, and other advantages are realized, in accordance with the presently preferred embodiments of these teachings.

In one aspect this invention provides a method to operate an event server with a subscriber unit. The method includes formulating a query; sending a subscription request message to the event server, the subscription request message comprising the query; responsive to a receipt of the subscription request message, parsing the query; and accepting the subscription request if the query is successfully parsed and understood, and if appropriate resource data is available to the event server to determine a result of the query.

In another aspect this invention provides an event notification system that includes a data communications network, at least one event server coupled to the data communications network, and at least one subscriber coupled to the data communications network. The subscriber is operable to formulate a query and to send a subscription request message to the event server, where the subscription request message includes query semantics. The event server is responsive to a receipt of the subscription request message to parse the query semantics to determine whether to accept or reject the subscription request. The subscription request is accepted if the query semantics are successfully parsed and understood, and appropriate resource data is available to the event server to determine a result of the query.

In another aspect this invention provides an event server having an interface for coupling to a data communications network and a control logic that is responsive to the receipt of a subscription request query message from a subscriber to subscribe to resource_query events. The query message contains query semantics, and the event server includes logic to parse the query semantics to determine whether to accept or reject the subscription request, where the subscription request is accepted if the query semantics are successfully parsed and understood, and appropriate resource data is available at least one of locally and remotely to the event server to determine a result of the query.

In a further aspect thereof this invention provides a subscriber unit, such as a wireless mobile communications device or terminal, that has an interface for coupling to a data communications network and a control logic for generating a resource_query event package having a body portion that contains a query that operates on resource data at an event server.

In the preferred embodiment the event server comprises a Session Initiation Protocol (SIP) event server, and the resource data is comprised of, as non-limiting examples, at least some of presence data, watcherinfo, call state and application-specific events.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

The present invention solves the foregoing and other problems by introducing an improved SIP event package that allows for subscribing to complex queries within a single dialog. The actual query is part of the subscription, and in response the SIP event server executes the required application logic for determining the appropriate resource list to satisfy and respond to the query. The use of this invention removes the burden from the subscriber and performs the matching functionality at the location where the relevant data resides, namely at the SIP event server itself. The invention also supports the use of arbitrary semantics for such queries, supports ontologies for semantic re-use, and integrates access control approaches, such as the XML-based Configuration Access Protocol, see J. Rosenberg, "The Extensible Markup Language (XML) Configuration Access Protocol (XCAP)", Internet Draft, Internet Engineering Task Force, (work in progress), May 2003), referred to hereafter as XCAP.

Figure 1:
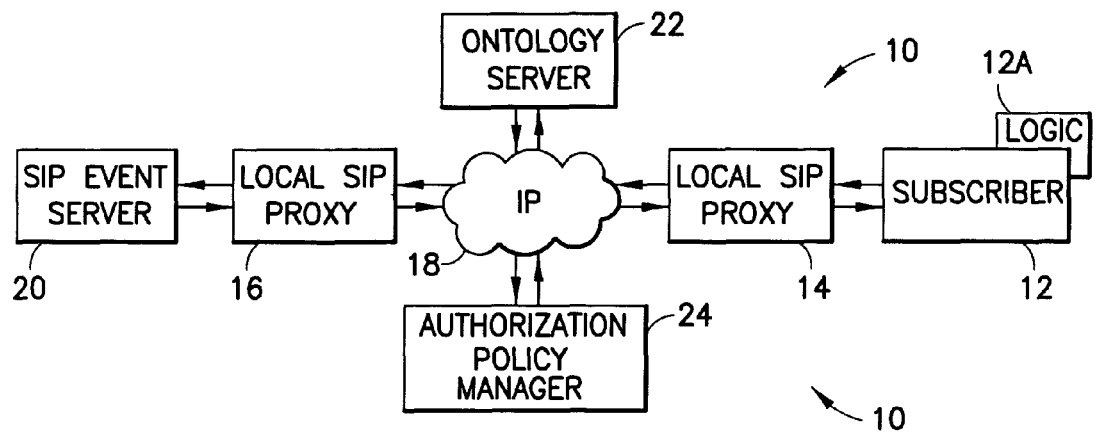
FIG. 1 shows the overall architecture and major logical entities of the present invention.

Referring to FIG. 1 there is shown a simplified architectural diagram of a system 10 that is suitable for practicing this invention. The system 10 includes a subscriber 12, local SIP proxies 14, 16, a network such as an Internet Protocol (IP) network 18, a SIP event server 20, an (optional) ontology server 22 and an authorization policy manager 24.

The SIP event server 20 implements SIP events and is assumed for convenience to be compliant with the procedures of "SIP-Specific Event Notification", A. Roach, RFC 3265, July 2002. It is assumed that the SIP event server 20 is a candidate for subscription for the abovementioned potential subscriber 12.

The SIP proxy 14 and the SIP proxy 16 are responsible for the handling of SIP messages and appropriately forwarding them to the specified entity. Note that the SIP proxies 14, 16 represent an exemplary embodiment of an entity that provides forwarding of registration/subscription/notification, as provided by the SIP event framework of RFC 3265. Other mechanisms could be used as well as an embodiment of the present invention. However, in the following description the SIP event servers 14 and 16 are referred to, without restricting the general nature of the present invention.

The ontology server 22 allows for registering and the querying of ontologies. For the purposes of this invention ontologies can be considered to capture the semantics of information from various sources and to give them a concise, uniform and declarative description (see, for example, Y. Ding, D. Fensel, "Ontology Library Systems: The key to successful Ontology Re use", August 2001).

In the presently preferred, but non-limiting embodiment of this invention the subscriber 12 is associated with a mobile wireless telecommunications device, such as a cellular telephone, or a personal communicator, or a mobile user or agent such as a computer that is coupled to the network 18 via a wireless link. The network 18 can comprise the Internet.

It is assumed in the presently preferred embodiment of this invention that both the subscriber 12, also referred to as a subscriber unit, and the event server 20 include an interface to the network 18, and suitably programmed control logic 12A and 20A-20F (see FIG. 3), respectively, for implementing this invention.

The present invention implements a method to enable queries for SIP event data such as:

"Which persons (resources) are in a meeting, the meeting being in a particular location?", and "Which persons (resources) are at work right now, with work location Boston, and are not busy?"

As was noted above, conventional SIP event subscriptions are bound to SIP URIs, associated with a priori known resources. The foregoing two exemplary queries, however, aim at determining a priori unknown SIP URIs that fulfil certain constraints. The set of URIs can be determined, for example, through appropriate aggregations and fusions of existing state information, associated to particular URIs, at the SIP event server 20, such as by derivation from existing presence information.

To support such queries, the present invention defines an appropriate SIP event package with a single event that is referred to herein for convenience, and not by way of limitation, as a resource_query. A subscriber 12 who wishes to initiate a query, such as one formulated above, subscribes to the SIP event of the resource_query SIP event package. The subscription body contains the actual query in an appropriate language. If the SIP event server 20 supports the event package of the subscription, and is able to parse the query successfully (this includes the ability to obtain the appropriate resource information necessary to respond to the query), the subscription dialog is established.

The SIP event server 20 includes an appropriate functionality to monitor all relevant resources for the particular query. Upon state changes for the relevant resources, the SIP event server 20 determines the list of resources that fulfils the query of the subscription. If the new resource list differs from the previous resource list the SIP event server 20 sends an appropriate notification to the subscriber 12, such as a notification that informs the subscriber 12 of the new resource(s) or of the removal of resource(s) from the previous list. For this purpose either full notifications (i.e., the full list of resources) or partial notifications can be used. Hence, the SIP event server 20 offers to the subscriber 12 a functionality that allows the latter to maintain the current list of resources that fulfill the desired query. The subscriber 12 includes logic that is responsive to the notification to take some action, such as displaying the changed resource list to a user thereby providing the user with the opportunity to determine if the resource change(s) are acceptable so as to continue with or cancel the current SIP event package subscription.

The present invention provides support for query semantic re-usage through ontologies by using content indirection methods for the subscription body, and further supports access control by integrating access control in the resource list determination process. IETF draft "draft-ietf-sip-content-indirect-mech-03", entitled "A Mechanism for Content Indirection in Session Initiation Protocol (SIP) Messages" (S. Olson, Jun. 2, 2003), describes a conventional mechanism to provide for content indirection in SIP messages. Reference can also be made to S. Olson, "Requirements for Content Indirection in Session Initiation Protocol", IETF Draft, September 2002.

In accordance with this invention, assume that the subscriber 12 desires to subscribe to resource_query events, as described below, according to a particular semantic for the query. The SIP event server 20 is assumed to implement particular SIP events, and is further assumed to be compliant with RFC 3265 (although compliance with RFC 3265 is not to be construed as a limitation upon the implementation and practice of this invention).

Figure 3:
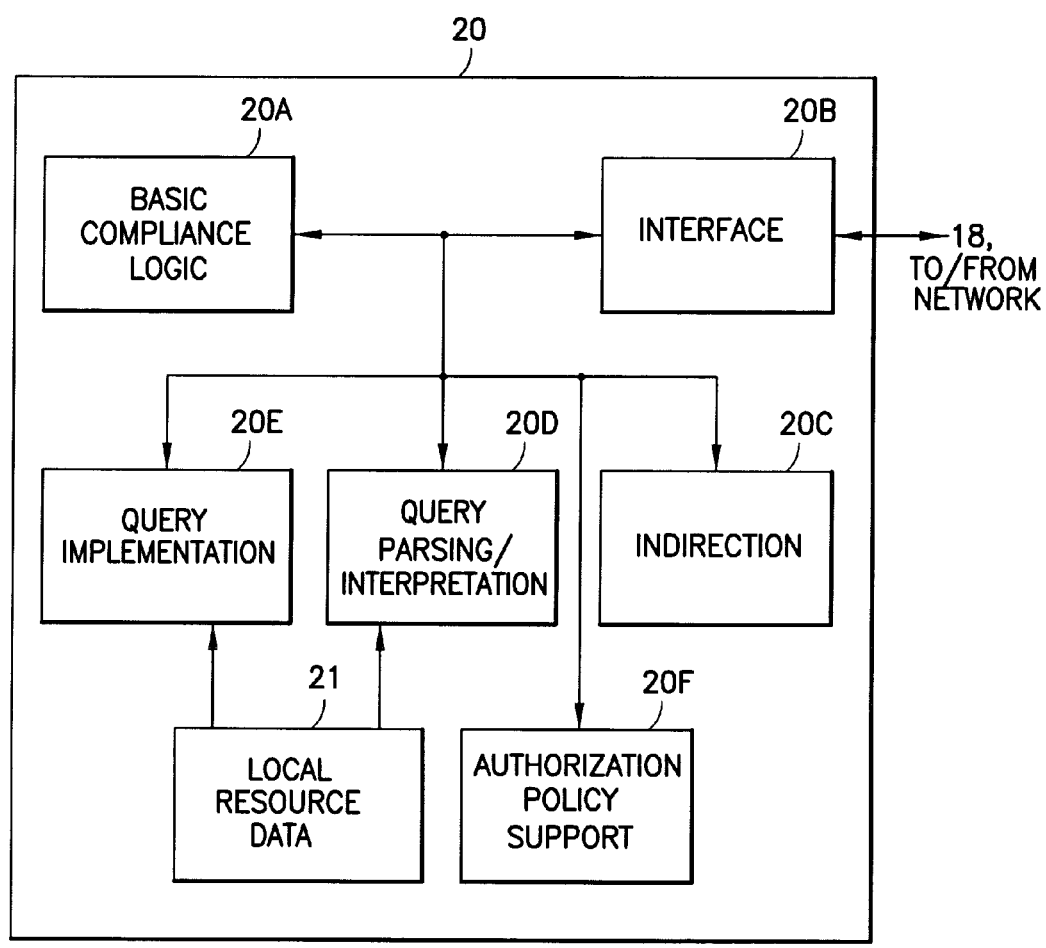
FIG. 3 shows a block diagram of the SIP event server of FIG. 1.

Referring to FIG. 3, in order to implement the present invention the SIP event server 20 further includes, apart from logic 20A providing functionality compliant with RFC 3265, and a network interface 20B, logic 20C providing support for a content indirection method, or some other method for retrieving data from the ontology server 22, for the case where one or more ontology servers are used to specify the query semantic. The SIP event server 20 further includes logic 20D to interpret the query semantic that is provided to the SIP event server through a resource_query event package subscription, as described below, so as to determine a resource list that will satisfy the query semantic, and also whether the SIP application server 20 is capable of supporting the required resource list. The logic 20D is shown as being coupled to local source of resource data 21. The SIP event server 20 further includes logic 20E to implement the desired query semantic that was provided to the SIP event server 20 through the resource_query event package subscription. Such an implementation preferably operates on the resource data 21 that resides locally on the SIP event server 20. However, it is also possible that such resource data is obtained in whole or in part from an external source, as discussed below with regard to the event package description. The SIP event server 20 preferably further includes logic 20F to support authorization policies to preserve the privacy of the resource data, for example in accordance with XCAP. However, this particular functionality is not required, and may be viewed as being optional. The authorization policy manager 24 allows for the definition of authorization policies for particular resource data, and may follow, as an example, the Rosenberg procedure as it pertains to communication between users of such policies, e.g., the SIP event server 20 and a so-called XCAP server (representing the Authorization Policy Manager 24 as shown in FIG. 1).

Discussed now is the event package definition that was referred to above. This invention defines a SIP event package with a single event, that is referred to as a "resource_query" in the remainder of this description. The semantics of the event package are as follows.

The SIP event package includes a subscription body that contains a query that operates on resource data (assumed to be available at or through the SIP event server 20) in the sense that it subscribes to the (possibly changing) list of resources that would fulfil the constraints defined in the query.

The query is formulated using a suitable query language. The exact syntax and semantics of the query language are outside the scope of the invention. However, notations such as Resource Description Format (RDF) or Extended Markup Language (XML) are suitable for use in formulating such queries. In order to share such query semantic information among a larger set of users, i.e., to create a common knowledge of semantics, the notion of the use of the ontology server(s) 22 is supported by the invention in the query subscription operation, as discussed below.

The resource data is assumed to be available at the SIP event server 20. This resource data can include the state associated with other SIP events that are hosted at the SIP event server 20. Non-limiting examples of such resource data can include the following.

A) Presence data, which includes all data defined in so-called presence documents, such as formulated in PIDF (presence information data format) or RPID (rich presence information data format).

B) Watcherinfo, which this includes data of subscribers to presence information or other SIP events.

C) Call state, which includes call state data.

D) Application-specific SIP events, which include resource data described through application-specific semantics, such as those enabled by the commonly assigned U.S. Patent Application of D. Trossen and D. Pavel, "Application Semantic Binding through SIP Event Package Template", Ser. No. 10/465,455, filed Jun. 19, 2003.

The resources are typically expressed as SIP URIs, where the presentity constitutes the resource while the associated presence document constitutes the resource data for the resource, i.e., the presentity.

All or part of the resource data may be available internally (such as through hosting appropriate SIP events that relate to the particular resource data,) or all or part of the data can be obtained externally.

For the former, the resource data that is used which is directly provided through the event packages that are implemented at the SIP event server 20. For instance, if the SIP event server 20 functions as a SIP presence server, the resource_query subscription could operate on the presence data as input.

For the latter, i.e., externally obtained resource data, the SIP event server 20 can perform appropriate data provisioning requests, such as SIP event subscriptions, to other network entities. For the sake of simplicity, it will be assumed in the following discussion that the resource data exists locally at the SIP event server 20 as the local resource data 21. However, obtaining the resource data externally is also within the scope of this invention.

For all or part of the resource data there may exist appropriate authorization policies that define the access rights to the particular resource data. As shown in FIG. 1, it is assumed that such authorization policies can be made available to the SIP event server 20 through the use of the optional authorization policy manager 24. If such authorization policies exist, it is assumed that the SIP event server 20 takes these into account when determining the list of resources that fulfil the constraints formulated in the query of the subscription.

The SIP event server 20 returns a '200 OK' return code to the subscriber 12, compliant with RFC 3265, if:

the semantics of the query have been fully understood; and appropriate resource data, required to determine the result of the query, is or can be made available to the SIP event server 20 (either locally or externally);

otherwise, the SIP event server 20 returns an error code to the subscriber 12 compliant with RFC 3265. Typical reasons for returning the error code can include non-support for the resource_query event package, reasons related to the semantics of the query (e.g., non-availability of required resources, complexity of the query), or internal reasons (e.g., the complexity of the query would overburden the SIP event server 20).

It is preferred that the SIP event server 20 sends a notification to the subscriber 12, compliant to RFC 3265, once the list of resources, which fulfilled the constraint formulated in the original query of the subscription, changes. Such a change can either be the removal of one or more resources, the insertion of one or more resources, or a combination of both. The body of the notification contains the revised resource list, formulated in an appropriate syntax, such as in an appropriate RDF-based or XML-based format for sending the resource list and resource list change. Compliant to RFC 3265 and to M. Linnfors, "Partial Notification of Presence Information", Internet Draft, Internet Engineering Task Force, (work in progress), January 2004, the resource list can be conveyed either as a full state or a partial state, i.e., the notification either contains the full list of resources that fulfils the query of the subscription or it contains a delta refresh list (only the changes) in an appropriate format.

Figure 2:
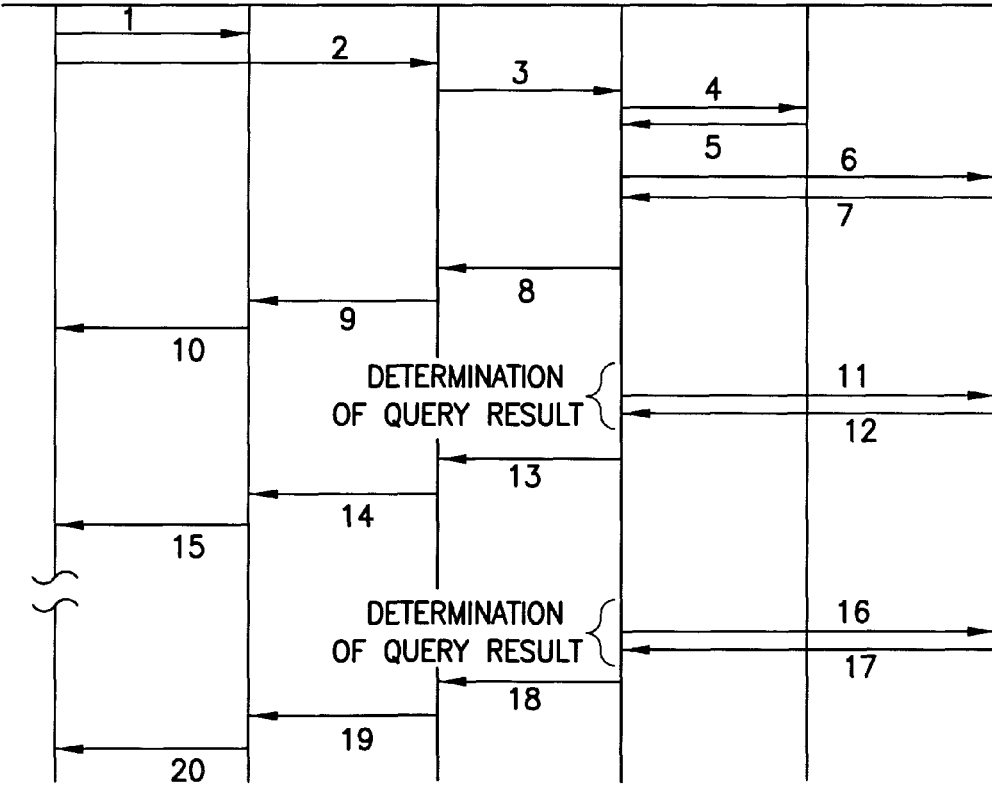
FIG. 2 illustrates various process steps and messages in accordance with the invention.

FIG. 2 shows the steps and messages that are implemented for obtaining the subscription to the resource_query event.

Compliant with RFC 3265, the subscriber 12 sends a SIP SUBSCRIBE (message 1 in FIG. 2) to the SIP event server 20 (routed as message 2 and 3 in FIG. 2 via the SIP proxies 14 and 16 to the SIP event server 20). The SUBSCRIBE message header includes the resource_query event identifier. It further includes in the message body the semantics of the query, as discussed above in the description of the resource_query event package.

Upon receipt of the subscription message (message 3 in FIG. 2), the SIP event server 20 extracts the message body and parses the included semantic information of the query. For supporting ontology servers 22 (for re-using and sharing semantic definition among several subscribers), the message body may include links to such ontologies. Content indirection methods, such as the one described by S. Olson, "Requirements for Content Indirection in Session Initiation Protocol", IETF Draft, September 2002, are used to retrieve the semantic information from the specified (ontology) server 22 (shown as messages 4 and 5 in FIG. 2). The retrieved information is then parsed by the SIP event server 20 as if given directly in the message body. During the parsing of the semantics of the query, the SIP event server 20 also verifies the existence of access rights for resource data that has been specified in the query of the subscription. Although the specifics of the particular authorization framework are outside the scope of the invention, methods such as XCAP provide a means to obtain such authorization policies from (typically external) XCAP servers. This is shown as messages 6 and 7 in FIG. 2. Such retrieval of authorization policies may occur several times throughout the parsing of the query.

As stated above, the SIP event server 20 confirms the subscription message accordingly. If the subscription can be granted, the SIP event server 20 sends back a '200 OK' (message 8 in FIG. 2), routed as messages 9 and 10 to the subscriber 12. If the subscription cannot be granted the SIP event server 20 sends back an appropriate error code, compliant with RFC 3265, (message 8 in FIG. 2), routed as messages 9 and 10 to the subscriber 12.

If the subscription has been granted, the SIP event server 20 installs and executes an appropriate application logic that determines the resource list that fulfils the constraints in the query of the subscription. The resource list application logic operates based on the semantics given in the original query, and uses the appropriate resource data, obtained either locally or externally, throughout this determination. In practical terms, the resource list application logic is responsible for answering questions posed by the resource_query subscription by determining the appropriate resource list throughout the lifetime of the resource_query subscription. Such functionality may be implemented locally within the SIP event server 20, and was referred to above as the application logic 20D that is shown in FIG. 3.

Compliant with RFC 3265 the SIP event server 20 sends an initial SIP NOTIFY to the subscriber 12 (message 13 in FIG. 2, routed as messages 14 and 15 to the subscriber 12), representing the start state of the subscription. For this purpose the application logic 20D determines the initial set of resources that fulfill the query of the subscription. Note that throughout this determination, it may be desirable to determine the appropriate authorization policies for the subscriber 12 with respect to the considered resource data. For this purpose the appropriate authorization policies are obtained from the authorization policy manager 24, shown as messages 11 and 12 in FIG. 2.

If, throughout the lifetime of the subscription, the abovementioned application logic 20D determines a change of the resource list that fulfils the query of the subscription, it generates appropriate notifications to the subscriber 12. Note that for this determination to occur it may be desirable to determine the appropriate authorization policies for the subscriber 12 with respect to the considered resource data. For this purpose the appropriate authorization policies are obtained from the authorization policy manager 24, shown as messages 16 and 17 in FIG. 2.

Compliant to RFC 3265 and to M. Linnfors, "Partial Notification of Presence Information", Internet Draft, Internet Engineering Task Force, (work in progress), January 2004, the SIP event server 20 may generate full state or delta state notifications to the subscriber 12, sent as message 18 in FIG. 2, routed as messages 19 and 20 in FIG. 2. Hence, the subscriber 12 receives an updated list of resources that fulfills the initial query of the subscription.

Based on the information in the resource list, the subscriber 12 may choose to implement a particular service, such as a context-aware service (the query constraints constituting the context for which the service is executed). In this regard the queried resource URIs constitute the URIs in a certain context.

As can be appreciated based on the foregoing discussion, one important advantage that is gained by the use of this invention is the enablement of complex queries in a SIP-based environment. Such a query can be realized within a single subscription dialog. The present invention thus dramatically improves the scalability of solutions that would provide answers to such queries, such as the exemplary queries presented above that require simultaneous knowledge of several resources, such as persons, times, locations and activities or states. The use of this invention thus reduces the burden on the subscriber 12, by resolving the multi-faceted query into a single subscription dialog.

Another advantage of this invention is that it further enables semantic re-use through ontology support. Additionally, the invention may employ access right considerations, such as one based on the conventional XCAP method, in the determination of the query answer. That is, this invention preserves the integrity of current and future privacy frameworks for SIP events.

Another advantage of this invention is the control of complexity at the SIP event server 20. Although the queries for resource lists can easily become fairly complex, it is the function of the SIP event server 20 to determine whether a particular subscription is granted. Hence, if the additional subscription dialog would overburden the SIP event server 20 due to its complexity, the subscription can simply be rejected (even though the SIP event server 20 is technically capable of supporting the requested subscription). This allows for a simple technique to control the scalability of the SIP event server 20 with respect to the supported complexity and the number of supported resource_query subscriptions.

To support this functionality the SIP event server 20 is enhanced relative to conventional servers to provide additional query parsing and data mining or analysis functionality. Note that the data mining/analysis functionality occurs on a set of existing data, as there is no additional data that is required to be gathered from other supported event packages in the SIP event server 20. If one or both of the query parsing and data mining/analysis functionalities are not supported by the SIP event server 20, the SIP event server 20 can simply reject the resource_query event package. Hence, this invention provides a modular, scalable and expandable solution, that simplifies the deployment of such query support in a network of SIP event servers 20.

Based on the foregoing description, it can be appreciated that this invention provides a system and a method in which queries are used to determine a set of resources being in a particular state. The state, for example, can relate to particular context information, such as current location, activity, certain preferences, or affective state. Together with a high-level semantic description of events, such as enabled by the system and method enabled by the commonly assigned U.S. Patent Application of D. Trossen and D. Pavel, "Application Semantic Binding through SIP Event Package Template", Ser. No. 10/465,455, filed Jun. 19, 2003, the use of this invention permits answering questions such as:

"Which persons (resources) are in a meeting, the meeting being in a particular location?"; and "Which persons (resources) are at work right now, with work location Boston, and are not busy?"

The answer to these questions is a list of resources, satisfying formulated constraints. The determined list of resources can then be used to provide certain context-aware services to these resources. For example, one could send certain messages to resources, e.g., SIP entities, which are in a particular state, i.e., in a particular context.

It can thus be appreciated that in one aspect thereof this invention provides a SIP event framework that permits formulating questions or queries for an event package within a single subscription. This invention defines a proper SIP event package and the method of subscription, supports arbitrary semantic descriptions for the query and also allows for integrating ontology-based semantics by using re-direction methods for the query language. Another aspect of this invention provides support for appropriate access and privacy rights when obtaining the resource information.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent message type and formats, resources and network architectures, may be attempted by those skilled in the art. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A method, comprising:
   receiving a session initiation protocol subscribe message at a session initiation protocol event server from a user device, the session initiation protocol subscribe message being for a subscription to an event package comprised of a single event, where the session initiation protocol subscribe message comprises a message header specifying a resource query event identifier and a message body that comprises a resource query formulated in a query language, the resource query operating on resource data available at at least one of the session initiation protocol event server and through the session initiation protocol event server;
   determining if the subscription can be granted by parsing semantic information contained in the message body of the session initiation protocol subscribe message and, based on the parsed semantic information, determining using at least an aggregation of existing resource state information a list of resources that are a priori unknown at the user device and that fulfill constraints of the resource query during a lifetime of the subscription, where the list of resources that are a priori unknown at the user device comprises a plurality of resources;
   sending the determined list of resources that fulfill constraints of the resource query to the user device as a start state of the subscription; and
   during the lifetime of the subscription sending a notification to the user device in response to a change occurring in the determined list of resources.

2. The method as in claim 1, where it is determined that the subscription cannot be granted if the semantic information cannot be successfully parsed, if appropriate resource information cannot be obtained to respond to the resource query, or if the session initiation protocol event server cannot support the event package.

3. The method as in claim 1, where determining the list of resources is performed at the session initiation protocol event server in cooperation with an authorization policy management function to verify existence of access rights for the user terminal to the determined resources.

4. The method as in claim 1, where parsing is performed at the session initiation protocol event server in cooperation with an ontology server.

5. The method as in claim 1, where the message body comprises at least one link to an ontology server to be used when parsing the semantic information.

6. The method as in claim 1, where parsing is performed at the session initiation protocol event server using a content indirection technique.

7. The method as in claim 1, where determining if the subscription can be granted comprises consulting at least one of a local source of resource data and a remote source of resource data and determining if appropriate resource data is available to grant the subscription.

8. The method as in claim 1, where the notification comprises a complete list of the resources including a resource or resources that have changed.

9. The method as in claim 1, where the notification comprises a partial list of the resources containing only the resource or resources that have changed.

10. The method as in claim 1, where the user device is embodied as a mobile wireless telecommunications device.

11. The method as in claim 1, where resource data is comprised of at least some of presence data, watcherinfo, call state and application-specific events.

12. A method, comprising:
    sending a session initiation protocol subscribe message to a session initiation protocol (SIP) event server from a user device, the session initiation protocol subscribe message comprising a resource query being for a subscription to an event package comprised of a single event and comprising information for enabling the session initiation protocol event server to determine a list of resources that are a priori unknown at the user device that fulfill constraints of the resource query during a lifetime of the subscription, where the list of resources comprises a plurality of resources, where the session initiation protocol subscribe message comprises a message header specifying a resource query event identifier and a message body that comprises the resource query formulated in a query language, the resource query operating on resource data available at at least one of the session initiation protocol event server and through the session initiation protocol event server;
    receiving the determined list of resources that fulfill constraints of the resource query at the user device as a start state of the subscription; and
    during the lifetime of the subscription, receiving a notification at the user device in response to a change occurring in the determined list of resources.

13. The method as in claim 12, where the message body comprises at least one link to an ontology server to be used when parsing the semantic information.

14. The method as in claim 12, where the notification comprises one of a complete list of the resources including a resource or resources that have changed or a partial list of the resources containing only the resource or resources that have changed.

15. The method as in claim 12, where the user device is embodied as a mobile wireless telecommunications device.

16. An apparatus comprising:
   at least one processor; and
   at least one memory including computer program code,
   the at least one memory and the computer program code configured to, with the at least one processor, cause the apparatus to
   receive a session initiation protocol subscribe message at a session initiation protocol event server from a user device, the session initiation protocol subscribe message being for a subscription to an event package comprised of a single event, where the session initiation protocol subscribe message comprises a message header specifying a resource query event identifier and a message body that comprises a resource query formulated in a query language, the resource query operating on resource data available at at least one of the session initiation protocol event server and through the session initiation protocol event server;
   determine if the subscription can be granted by parsing semantic information contained in the message body of the session initiation protocol subscribe message and, based on the parsed semantic information, determining using at least an aggregation of existing resource state information a list of resources that are a priori unknown at the user device and that fulfill constraints of the resource query during a lifetime of the subscription, where the list of resources are a priori unknown at the user device comprises a plurality of resources;
   sending the determined list of resources that fulfill constraints of the resource query to the user device as a start state of the subscription; and
   during the lifetime of the subscription, to send a notification to the user device in response to a change occurring in the determined list of resources.

17. The apparatus as in claim 16, where it is determined that the subscription cannot be granted if the semantic information cannot be successfully parsed, if appropriate resource information cannot be obtained to respond to the resource query, or if the session initiation protocol event server cannot support the event package.

18. The apparatus as in claim 16, where determining the list of resources is performed at the session initiation protocol event server in cooperation with an authorization policy management function to verify existence of access rights for the user terminal to the determined resources.

19. The apparatus as in claim 16, where parsing is performed at the session initiation protocol event server in cooperation with an ontology server.

20. The apparatus as in claim 16, where the message body comprises at least one link to an ontology server to be used when parsing the semantic information.

21. The apparatus as in claim 16, where parsing is performed at the session initiation protocol event server using a content indirection technique.

22. The apparatus as in claim 16, where determining if the subscription can be granted comprises consulting at least one of a local source of resource data and a remote source of resource data and determining if appropriate resource data is available to grant the subscription.

23. The apparatus as in claim 16, where the notification comprises a complete list of the resources including a resource or resources that have changed or comprises a partial list of the resources containing only the resource or resources that have changed.

24. The apparatus as in claim 16, where resource data is comprised of at least some of presence data, watcherinfo, call state and application-specific events.

25. An apparatus comprising:
   at least one processor; and
   at least one memory including computer program code,
   the at least one memory and the computer program code configured to, with the at least one processor, cause the apparatus to
   send a session initiation protocol subscribe message to a session initiation protocol event server from a user device, the session initiation protocol subscribe message comprising a resource query for a subscription to an event package comprised of a single event and comprising information for enabling the session initiation protocol event server to determine a list of resources that are a priori unknown at the user device that fulfill constraints of the resource query during a lifetime of the subscription, where the list of resources comprises a plurality of resources, where the session initiation protocol subscribe message comprises a message header specifying a resource query event identifier and a message body that comprises the resource query formulated in a query language, the resource query operating on resource data available at at least one of the session initiation protocol event server and through the session initiation protocol event server;
   receive the determined list of resources that fulfill constraints of the resource query at the user device as a start state of the subscription; and
   during the lifetime of the subscription, to receive a notification at the user device in response to a change occurring in the determined list of resources.

26. The apparatus as in claim 25, where the message body comprises at least one link to an ontology server to be used when parsing the semantic information.

27. The apparatus as in claim 25, where the notification comprises a complete list of the resources including a resource or resources that have changed or comprises a partial list of the resources containing only the resource or resources that have changed.

28. The apparatus as in claim 25, where the user device is embodied as a mobile wireless telecommunications device.

29. A non-transitory computer-readable storage medium carrying one or more sequences of one or more instructions which, when executed by one or more processors, cause an apparatus to at least perform the following steps:
   receiving a session initiation protocol subscribe message at a session initiation protocol event server from a user device, the session initiation protocol subscribe message being for a subscription to an event package comprised of a single event, where the session initiation protocol subscribe message comprises a message header specifying a resource query event identifier and a message body that comprises a resource query formulated in a query language, the resource query operating on resource data available at at least one of the session initiation protocol event server and through the session initiation protocol event server;
   determining if the subscription can be granted by parsing semantic information contained in the message body of the session initiation protocol subscribe message and, based on the parsed semantic information, determining using an aggregation of at least existing resource state information a list of resources that are a priori unknown at the user device and that fulfill constraints of the resource query during a lifetime of the subscription, where the list of resources that are a priori unknown at the user device comprises a plurality of resources;

sending the determined list of resources that fulfill constraints of the resource query to the user device as a start state of the subscription; and during the lifetime of the subscription sending a notification to the user device in response to a change occurring in the determined list of resources.

30. The non-transitory computer-readable storage medium as in claim 29, where it is determined that the subscription cannot be granted if the semantic information cannot be successfully parsed, if appropriate resource information cannot be obtained to respond to the resource query, or if the session initiation protocol event server cannot support the event package.

31. The non-transitory computer-readable storage medium as in claim 29, where determining the list of resources is performed at the session initiation protocol event server in cooperation with an authorization policy management function to verify existence of access rights for the user terminal to the determined resources, and where parsing is performed at the session initiation protocol event server in cooperation with an ontology server.

32. The non-transitory computer-readable storage medium as in claim 29, where the message body comprises at least one link to an ontology server to be used when parsing the semantic information.

33. The non-transitory computer-readable storage medium as in claim 29, where parsing is performed at the session initiation protocol event server using a content indirection technique.

34. The non-transitory computer-readable storage medium as in claim 29, where the notification comprises a complete list of the resources including a resource or resources that have changed or comprises a partial list of the resources containing only the resource or resources that have changed.

35. The non-transitory computer-readable storage medium as in claim 29, where resource data is comprised of at least some of presence data, watcherinfo, call state and application-specific events.

36. A non-transitory computer-readable storage medium carrying one or more sequences of one or more instructions which, when executed by one or more processors, cause an apparatus to at least perform the following steps:

sending a session initiation protocol subscribe message to a session initiation protocol event server from a user device, the session initiation protocol subscribe message comprising a resource query for a subscription to an event package comprised of a single event and comprising information for enabling the session initiation protocol event server to determine a list of resources that are a priori unknown at the user device that fulfill constraints of the resource query during a lifetime of the subscription, where the list of resources comprises a plurality of resources, where the query comprises a message header specifying a resource query event identifier and a message body that comprises the resource query formulated in a query language, the resource query operating on resource data available at at least one of the session initiation protocol event server and through the session initiation protocol event server;

receiving the determined list of resources that fulfill constraints of the resource query at the user device as a start state of the subscription; and during the lifetime of the subscription, receiving a notification at the user device in response to a change occurring in the determined list of resources.

37. The non-transitory computer-readable storage medium as in claim 36, where the message body comprises at least one link to an ontology server to be used when parsing the semantic information.

38. The non-transitory computer-readable storage medium as in claim 36, where the notification comprises a complete list of the resources including a resource or resources that have changed or comprises a partial list of the resources containing only the resource or resources that have changed.

39. The non-transitory computer-readable storage medium as in claim 36, where the user device is embodied as a mobile wireless telecommunications device.

* * * * *

UNITED STATES PATENT AND TRADEMARK OFFICE
CERTIFICATE OF CORRECTION

PATENT NO. : 8,903,820 B2
APPLICATION NO. : 10/874946
DATED : December 2, 2014
INVENTOR(S) : Trossen et al.

Page 1 of 1

It is certified that error appears in the above-identified patent and that said Letters Patent is hereby corrected as shown below:

In the Claim

Col. 12, Line 39, Claim 12 Delete "(SIP)".

Col. 12, Line 41, Claim 12 Delete "being".

Signed and Sealed this
Third Day of March, 2015

Michelle K. Lee
*Deputy Director of the United States Patent and Trademark Office*